United States Patent Office 2,795,292
Patented June 11, 1957

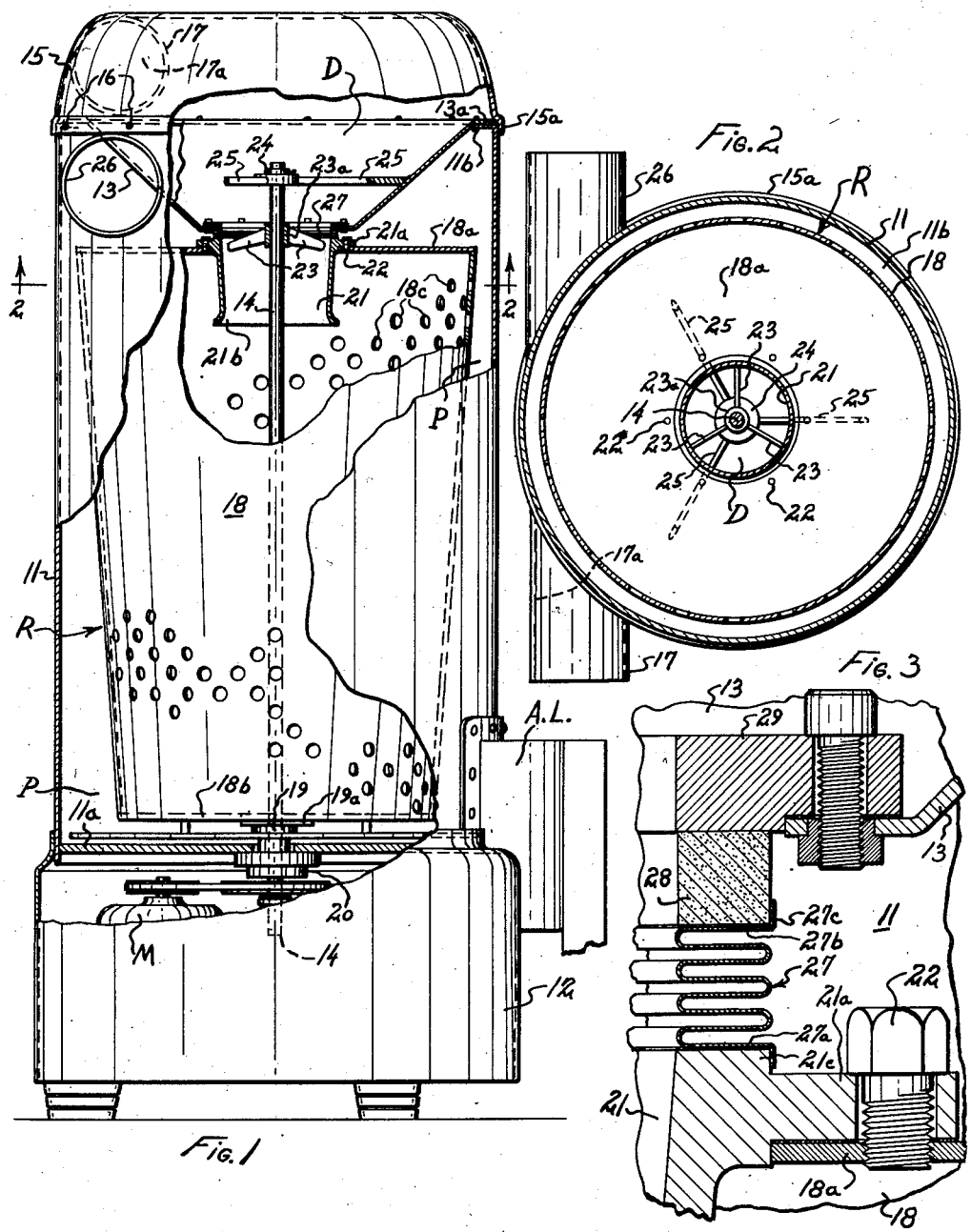

2,795,292

CENTRIFUGAL MACHINE FOR SEPARATING PARTICLES FROM A MOVING GASEOUS STREAM

William B. Richards, Minneapolis, Minn., assignor to Superior Separator Company, Hopkins, Minn., a corporation of Delaware Application November 9, 1953, Serial No. 390,912

8 Claims. (Cl. 183—77)

This invention relates to centrifugal machines or apparatus for removing particles from a moving gaseous stream and particularly, to certain valuable improvements in the general types of centrifugal separating machines disclosed in pending applications for United States Letters Patent of William R. Carter, Serial Numbers 229,030 and 303,594, now Patents No. 2,709,500 and No. 2,747,687 respectively.

The centrifugal separating machines of said identified Carter patent applications efficiently employ the action of a rapidly revolving, hollow rotor of general cylindrical or tapered contour having closed end portions and a peripheral wall densely perforated at least in zones, with apertures of a size to freely permit passage of entrained particles therethrough during revolution and where the rotor provides substantially unobstructed passage space within for simultaneous radial and axial movement of the gaseous stream therethrough along at least one substantially unobstructed vortex-like path. This general construction of rotor is cooperatively associated with a tubular "clean gas" withdrawal tube axially disposed at one end of the rotor and preferably projecting for some distance therein and of smaller cross sectional area than the mean cross sectional area of the rotor, whereby the perforated rotor will drive a continuous entering particle-laden gaseous stream, setting up both exterior and interior vortices and where the gaseous vortex within the rotor will spiral towards the axial air withdrawal tube constantly decreasing in diameter and thereby progressively increasing the angular velocity of the stream in its travel for withdrawal. This peculiar operation subjects the particles carried in the gaseous stream to a progressively increasing centrifugal force resulting in efficient separation of very fine particles.

Machines of both types of said Carter constructions have generally demonstrated an unexpectedly high efficiency in the separation of very fine as well as the coarser solid and liquid particles entrained in a moving gaseous stream. In such apparatus, it is essential for the maximum efficiency in separation and collection of the finer particles to provide a substantially perfect sealing medium between the rapidly revolving rotor and a stationary, "clean" discharge chamber which will withstand long, continuous rotary wear and which will exclude particle-laden air disposed in the outer rotor vortex or which may surround the air withdrawal tube. The conception or discovery of a stationary sealing medium closely cooperating with the revolving gas withdrawal tube has presented a difficult problem, particularly in the construction and proper operation of the larger centrifugal separating machines wherein withdrawal tubes for the "clean" gaseous stream necessarily are of substantial diameter often exceeding six inches and, in some instances, having a maximum diameter of as high as twenty inches.

It is an object of my invention to provide a centrifugal separating machine of the type described wherein an economical but highly efficient sealing medium is provided between the gas withdrawal portion of the rotor and the gas discharge passage or duct, resulting in an improved efficiency as contrasted with the earlier Carter constructions and furthermore, capable of taking up or compensating for wear to always exclude the entrance of a particle-laden gaseous medium into the withdrawal and discharge means.

A further object is the provision in a machine of the class described of a close cooperative relationship between a new and improved sealing medium and the "clean gas" discharge chamber and the intake of particle-laden gas into the housing, whereby a more efficient direction of the entering, moving stream of particle-laden gas is accomplished with a resultant higher capacity of the machine for accomplishing separation and collection of the particles.

These and other objects and advantages of my invention will more fully appear from the following description made in connection with the accompanying drawings wherein like character references refer to similar parts throughout the several views and in which:

Fig. 1 is a view generally in side elevation of a large size embodiment of my improved machine with portions of the rotor housing and the rotor itself being broken away;

Fig. 2 is a cross section taken on the line 2—2 of Fig. 1; and

Fig. 3 is a fragmentary cross section on a larger scale taken vertically through a portion of the air withdrawal tube and showing a preferred embodiment of my improved sealing structure.

Referring now to the large, high capacity embodiment of the invention illustrated in the drawings, a vertical cylindrical rotor housing 11 is employed, having a smooth, internal, cylindrical wall and a closed bottom 11a in the form of a smooth disc. Housing 11 as shown, is supported upon a large concentric, cylindrical base 12 wherein is mounted and housed in the form shown, an electric motor M for driving the rotor with suitable driving connections, not shown, between the armature shaft of the motor and the rotor shaft 14. The upper end of rotor housing 11 is substantially closed by a removable, inverted, truncated conical partition 13 axially disposed of the housing 11 and supported and secured as shown by an integrally formed, out-turned, horizontal attachment flange 13a bolted or otherwise secured in sealed relation against a narrow, inturned annular flange 11b at the top of the housing.

A removable bonnet or dome 15 snugly fits the top of rotor housing 11 and the peripheral edge of the cone partition 13. Bonnet 15 has as shown, a narrow offset, depending lower edge or skirt 15a which telescopes over the upper extremity of housing 11 and is secured in sealed relation thereto by suitable means such as the circumferentially spaced, self-tapping screws 16. The interior of the bonnet 15 with the cone partition 13 defines an enclosed gas discharge chamber D which is disposed axially above the rotor R and as shown, has a tangential discharge passage 17 through the peripheral wall of bonnet 15 which may communicate with the large discharge duct 17a (see Fig. 2).

The rotor R of the embodiment illustrated is in the form of an elongated, truncated conical hollow body having an imperforate upper end or closure 18a and an imperforate lower end of closure 18b of smaller diameter and having its tapered or truncated conical, peripheral wall 18 densely perforated with apertures 18c of a size to readily permit passage therethrough of the largest particles entrained in a moving stream of particle-laden air or other gaseous medium admitted to the upper end of housing 11. In actual practice, where circular apertures 18c are utilized as in the form shown, the diameter thereof will usually range between 3/16 of an inch and 5/16 of an inch.

Rotor R is rigidly affixed to the vertical rotor shaft 14 and to this end, the lower end 18b of the rotor is apertured to accommodate the lower portion of shaft 14 and a reinforcing and sealing collar 19 is affixed to shaft 14 and has an annular attachment flange 19a rigidly affixed to and sealed against the bottom end 18a of the rotor. Shaft 14 is extended downwardly within the hollow base 12 and a suitable thrust bearing 20 is provided preferably of the ball race type for supporting the shaft and rotor, said bearing being suitably mounted within base 12.

At the upper end of rotor R, an axially disposed, depending "clean gas" withdrawal sleeve 21 is affixed concentrically to the top disc or closure 18 of the rotor, having, as shown, at its upper end an annular attachment flange 21a which may be bolted by cap screws 22 against the top disc 18a of the rotor to seal the joint between sleeve 21 and the rotor top. The withdrawal sleeve 21, as shown, depends axially into the upper end of the rotor for some distance and in the form illustrated, terminates at its lower end in an open orifice provided by a slightly out-turned lip 21b. A spider 23 having, as shown, three arms is rigidly secured to the upper portion of withdrawal tube 21 and has a hub 23a which is affixed by set screw or the like to the upper portion of rotor shaft 14. Sleeve 21 is in open and substantially unrestricted communication with the interior of the axial portion of rotor R and is also in open communication at its upper end with the interior of the gas discharge chamber D.

The upper end of rotor shaft 14 as shown, is suitably journaled in a bearing assembly 24 preferably of the ball-bearing type, which is supported from the three arms of a large spider 25, the arms of which are secured at their outer ends to appropriate points on the inverted conical wall of partition 13.

In the form of the invention shown, the particle-laden air or gaseous stream, is admitted tangentially of the upper portion of the rotor housing 11 through a duct 26 which fits and has sealed connection with a suitable aperture formed in the upper portion of cylindrical wall 11 thereby causing entering particle-laden air or gas to be deflected circumferentially and downwardly by the undersurface of the cone partition 13 and thereafter, outwardly through the influence of the closed upper end 18a of the rotor.

It is, of course, highly essential in a centrifugal particle separating machine of the class described, that a substantially perfect sealed relation be provided between the rapidly revolving rotor and its discharge sleeve 21 affixed thereto and the stationary discharge chamber D of the machine to prevent even the finest particles of solid or liquid materials from passing into the discharge chamber. The problem of providing a satisfactory seal between the exterior of the discharge sleeve 21 and the discharge chamber D is greatly accentuated in large capacity machines where the over-all diameter of the discharge sleeve may vary all the way from 6 to 20 inches or more. I have, after exhaustive experiments, discovered an efficient sealing mechanism which is adapted to closely cooperate with the peculiar construction and operation principles of the centrifuge rotor and "clean gas" withdrawal sleeve or tube. My preferred sealing mechanism comprises a cylindrically arranged Sylphon bellows 27 constructed of thin, non-corrosive, resilient metal and shaped into a plurality of tortuously arranged, continuous convolutions and having at its lower end an attachment end 27a provided with a downturned lip. Such attachment end and lip snugly fits and is secured in sealed relation to the upstanding annular collar 21c provided at the upper end of the withdrawal sleeve 21 (see Fig. 3). The upper end of metal bellows 27 has a smooth, annular, horizontal attachment convolution 27b provided with an upturned annular lip 27c and said end has fixedly attached in sealed relation thereto, a sealing annulus 28 of substantial thickness constructed from a special hard composition which has self-lubricating properties, a very low co-efficient of friction and is mechanically very strong, with a very low co-efficient of expansion. Pressure molded carbon-graphite has been found highly satisfactory and can be commercially obtained in forms as hard as steel, being of course resistant to chemical attack, and incapable of warping. It is to be understood that equivalent hard, self-lubricating pressure molded materials such as certain bronze graphite and compositions containing molybdenum sulphide are satisfactory for the purposes intended. The upper smooth surface of the sealing annulus 28 contacts the smooth, horizontal surface of a concentric fixed sealing ring 29 bolted or otherwise secured in sealed relation to an inturned, horizontal and annular lip provided at the lower end of the inverted conical partition 13. The under or bearing surface of metal sealing ring 29 is preferably somewhat wider than the width of the carbon graphite sealing ring 28.

In the assembly of the rotor R on its shaft 14 and in the attachment of the hub of spider 23 to shaft 14 and the locking of bearing assembly 24 at the upper end of the shaft, adjustment is made to compress the metal bellows 27. In machines where the withdrawal tube or sleeve 21 is of a diameter between 6 and 9 inches, the bellows structure 27 as shown, is compressed approximately 1/8 of an inch. With compression, a substantially frictional bearing seal is made between the opposing surfaces of graphite ring 28 and the smooth metal sealing ring 29. Furthermore, the said compression of the bellows 27 takes up for the slight wear in the sealing rings over long continuous use and always assures a gas-proof seal between the rapidly revolving discharge sleeve of the rotor and the stationary orifice of the "clean gas" discharge chamber D. Of course, it will readily be appreciated that the parts of my sealing structure may be reversed with the metal bellows and graphite ring 28 carried by the orifice of the discharge chamber D and with the smooth metal sealing ring 29 carried by the revolving rotor.

The sealing structure previously described is exceedingly simple, economical and furthermore, does not encumber or obstruct the swirling gaseous stream either exteriorly or internally of the cooperating parts, including the top of the rotor, the air withdrawal passage and the inverted conical partition 13. The said combination of parts with the intake duct 26 communicating with one side of the upper housing 11 causes entering particle-laden air to initially swirl about the inverted conical surface 13 of the discharge chamber to be deflected outwardly and radially in its travel through partition 13 and the imperforate upper end 18a of the rotor to be driven by the periphery of rotor 18 and to constitute the exterior separation vortex between the rotor and the rather closely spaced rotor housing 11.

The annular chamber formed between the rotor and housing 11 constitutes a particle collection chamber P wherein the centrifugally separated particles spirally work their way and fall towards the bottom 11a of the rotor housing.

It is important that the interior of housing 11 be protected from turbulence or varying pressure conditions through influences exterior of the machine. To this end, I employ an efficient air lock structure designated as an entirety by the letters AL which may be of any suitable type such as the air lock disclosed in the co-pending application, Serial Number 303,594 of William R. Carter. The rotor of the air lock is driven at appropriate speed from belts and idlers connected with the power source or motor M housed within the base 12. The blades of the air lock structure, as in the identified Carter application preferably extend slightly inward of the communicating aperture in housing 11 to skim the collected particles and thereby facilitate controlled discharge thereof.

Operation

The centrifuge rotor is driven at relatively high speed, varying within a range, depending upon the nature of the use, all the way from a peripheral linear-foot-travel of from 5000 feet per minute up to 15,000 feet per minute. The higher speeds are utilized for centrifugally extracting smaller and less dense particles from the gaseous medium. Continuous flow of the particle-laden air or other gaseous medium is provided by connecting the system with either a pressure or suction source of circulation. The particle-laden air is introduced into the annular chamber defined between the inverted conical partition 13 and the closed top 18a of the rotor with of course, the surrounding upper portion of the rotor housing 11.

The entering gaseous medium deflected outwardly and radially by conical partition 13 with the assistance of the sealing structure and rotor top 18a, spirals and with the flow, passes downwardly and is rapidly driven through the revolution of the densely perforated, peripheral wall 18 of the rotor and constitutes in its spiral downward travel, an outer and primary separation vortex. In the downward movement of the gaseous medium, the denser and larger particles such as solids, are thrown outwardly by centrifugal force, collecting and working their way downwardly in the annular chamber P while simultaneously at the lower portions of the rotor shell, the light gaseous medium or air works its way inwardly through the apertures in the rotor shell 18.

The velocity pressure area is lowest at the lower portion of the annular chamber P surrounding the diminished, tapered or truncated conical rotor. Consequently, the whirling gaseous medium with the finer and less dense particles still entrained to some extent therein, enter to a substantial extent through the apertures formed in the lower portion of rotor R although some air or gaseous medium will work its way through apertures 18c in the upper portions of the rotor. The entering gaseous medium through the rapid driving effect of the interior of the hollow, apertured rotor forms a very uniform interior separation vortex and spirals upwardly due to the flow towards the upper end of the rotor. In such upward spiral travel, the finer and less dense particles are centrifugally separated, moving outwardly against and through the peripheral wall of the rotor and being collected in the annular particle-receiving passage P. The upward spiral travel of the interior or secondary vortex because of the peculiar relationship of the relatively small diameter withdrawal tube 21 constantly decreases in diameter and thereby, progressively increases the angular velocity of the stream in its travel towards the withdrawal tube 21. This increase of angular velocity of the spiral stream in leaving the rotor progressively increases the centrifugal force applied to finer particles there entrained and results in a more efficient separation of the finest particles from the air or other gaseous medium.

Unexpected results and efficiency are attained with my novel sealing construction between the upper end of withdrawal tube 21 and the entrance orifice to the discharge chamber D. The rapid and relative rotational movement between the composition ring 28 and the metal sealing ring 29 imparts to the very hard, self-lubricating composition ring 28, a mirrored or highly glazed, substantially frictionless bearing surface, with the result that even air or other gaseous medium is excluded from inwardly radial entrance through the sealing structure.

The desirable contouring of the inverted conical partition 13 defining the lower portion of the discharge chamber and the sealing mechanism provide important advantages over prior art structures and make possible a highly efficient machine in the larger sizes with almost a perfect sealing between the rotor and the discharge chamber.

It will of course be understood that various changes may be made in the form, details, arrangement and proportions of the parts without departing from the scope of my invention.

What I claim is:

1. In a machine for continuously processing a moving gaseous stream, a hollow driven rotor of symmetrical shape having a closed end, a stationary discharge chamber disposed longitudinally outward of said closed end and having an annular entrance disposed axially of said rotor, tubular communication means extending axially and outwardly of said rotor at said closed end and connecting the axial interior portion of said rotor with the entrance of said discharge chamber, said tubular communication means including a pair of opposed, surface-engaging annular sealing elements affixed respectively to the closed end of said driven rotor and to the entrance of said chamber, and both of said elements being disposed coaxially of said rotor with opposed sealing surfaces in tensioned contact, the sealing surface of one of said elements being constructed from hard metal and the sealing surface of said other element being constructed from a wear-resisting bearing material such as carbon graphite the sealing surfaces of said elements lying substantially in planes perpendicular to the axis of said rotor and a tensioning element in the form of a tensioned resilient annular metal bellows affixed to one of said sealing elements inwardly of the sealing juncture between the two.

2. In a machine for continuously processing a moving gaseous stream, a hollow driven rotor of symmetrical shape having a closed end, a stationary discharge chamber disposed longitudinally outward of said closed end and having an annular entrance disposed axially of said rotor, tubular communication means extending axially and outwardly of said rotor at said closed end and connecting the axial interior portion of said rotor with the entrance of said discharge chamber, said tubular communication means including a pair of opposed, surface-engaging annular sealing elements, one of said elements being affixed concentrically to the closed end of said rotor and having sealed relation therewith, and the other of said elements being affixed to said entrance of said chamber and extending also concentrically of said rotor, one of said elements comprising a tubular, resilient metal bellows under tension and a composition sealing ring secured and fixedly sealed with the outer end of said bellows and constructed of wear-resisting, self-lubricating material having a smooth outer surface extending normal and concentric to the axis of said rotor, and the other of said sealing elements constituting a rigid annulus having a smooth bearing surface extending normal to and axially of said rotor and disposed in sealed contact with said first mentioned sealing ring.

3. A centrifugal separating machine for removing particles from a moving gaseous stream having in combination a hollow, power-driven rotor of symmetrical shape for mounting in a chamber to which particle-laden gas is forcibly admitted, said rotor having an imperforate end portion for preventing passage of the gaseous streams longitudinally into said rotor and having a peripheral wall densely apertured with said apertures unobstructed, at least in zones thereof with apertures of a size to permit free passage of particles therethrough during revolution, a gas withdrawal tube of smaller diameter than the minimum diameter of said rotor having a receiving end disposed axially within one end of said rotor, said rotor providing a substantially unobstructed passage so that said gaseous medium in a vortex-like and spiral path will be generated by revolution thereof, decreasing in diameter from the medial portion of said rotor to said withdrawal tube, the angular velocity of said stream in said vortex-like path increasing with the decrease in diameter, an enclosed gas withdrawal chamber fixedly mounted at one end of said rotor adjacent said withdrawal tube and having an entrance orifice concentric with said withdrawal tube, a rotary sealing structure interposed between an annular portion of said withdrawal tube and an annular portion of said orifice, one of said annular portions having a metal sealing ring affixed thereto, said sealing ring having a smooth sealing surface disposed perpendicularly to the axis of said rotor and a metal bellows affixed to the other of said annular portions and extending coaxially thereof and of said rotor, and a composition sealing ring secured to and sealed with the outer end of said bellows concentrically thereof and constructed of hard, wear-resisting, self-lubricating material and having a smooth bearing and sealing surface in contact with the sealing surface of said metal ring and also disposed perpendicularly to the axis of said rotor.

4. A centrifugal separating machine for removing particles from a moving gaseous stream, having in combination a hollow, power-driven rotor of truncated conical shape having a closed end portion and a gradually tapering peripheral wall densely apertured at least in zones thereof with apertures being unobstructed and of a size to permit free passage of particles therethrough during revolution, a gas withdrawal tube of smaller diameter than the minimum diameter of said rotor having an annular receiving end disposed axially within the larger closed end of said rotor, said rotor providing a substantially unobstructed passage so that said gaseous medium in a vortex-like and spiral path will be generated by revolution of said rotor, decreasing in diameter from the medial portion of said rotor to said withdrawal tube, the angular velocity of said stream in said spiral path increasing with the decrease in diameter toward the receiving end of said withdrawal tube, an enclosed gas discharge chamber disposed longitudinally outwardly of said withdrawal tube and having an entrance orifice concentric with said withdrawal tube, means for directing inward flow of particle-laden air peripherally of the portion of said rotor adjacent said gas withdrawal tube, and rotary sealing structure interposed between an annular portion of said withdrawal tube and an annular portion of the orifice of said gas discharge chamber.

5. The structure set forth in claim 4 and a substantially cylindrical housing surrounding said rotor and disposed substantially concentrically thereof and spaced from the peripheral wall of said rotor to provide an annular, particle-collection chamber and said discharge chamber at its inward portion closing one end of said housing and tapering inwardly toward said withdrawal tube to define on its exterior a frusto conical deflector to assist in deflecting said entering particle-laden gaseous stream spirally exteriorly of said rotor toward the smaller closed end thereof.

6. The structure set forth in claim 4 and said gas withdrawal tube being affixed in sealed relation to the larger closed end of said rotor.

7. The structure set forth in claim 2, further characterized by said metal bellows extending continuously in substantially cylindrical form from the closed end portion of said rotor.

8. A centrifugal separating machine for removing fine particles from a moving gaseous stream, having in combination a hollow, power-driven rotor of truncated conical shape having a larger closed end portion and a gradually tapering peripheral wall densely provided with apertures therethrough, said apertures being unobstructed and of a size to permit free passage of particles therethrough during revolution of said rotor, a gas withdrawal tube of smaller diameter than the minimum diameter of said rotor but nevertheless being of substantial diameter for providing an unobstructed discharge conduit for the particle-freed gas, a housing surrounding said rotor whereby because of the truncated conical shape of said rotor a lower pressure area, in operation will be set up adjacent the diminished end of said rotor, and an enclosed gas discharge chamber disposed longitudinally outward of said gas withdrawal tube and communicating therewith and having an annular entrance orifice concentric with said withdrawal tube, means for directing inward flow of particle-laden air peripherally of the portion of said rotor adjacent said gas withdrawal tube; and rotary sealing mechanism, interposed between the delivery end of gas withdrawal tube and an annular zone adjacent said orifice, said sealing mechanism comprising a resilient, metal bellows having a sealed thrust connection with one of said annular elements and carrying a sealed annulus affixed thereto, said annulus having a smooth sealing surface disposed perpendicularly to the axis of said rotor and a second sealing annulus having sealed and fixed connection with the other of said elements and also having a smooth sealing surface disposed perpendicularly to the axis of said rotor and disposed in tensioned annular contact with said first sealing annulus.

References Cited in the file of this patent

UNITED STATES PATENTS

| 602,964 | Van Gelder | Apr. 26, 1898 |
| 1,649,220 | Goodloe | Nov. 15, 1927 |
| 2,110,098 | Strecker | Mar. 1, 1938 |
| 2,207,183 | Thrush | July 9, 1940 |
| 2,207,326 | Maier | July 9, 1940 |
| 2,246,277 | Davidson | June 17, 1941 |
| 2,255,172 | Johnson | Sept. 9, 1941 |
| 2,464,648 | Niederkorn | Mar. 15, 1949 |

FOREIGN PATENTS

| 380,680 | Germany | Sept. 11, 1923 |
| 516,758 | Belgium | Jan. 31, 1953 |
| 814,419 | France | Mar. 15, 1937 |